United States Patent
Stadele et al.

Patent Number: 5,514,062
Date of Patent: May 7, 1996

[54] MANIPULATOR

[76] Inventors: Erhard Stadele, deceased, late of Bermatingen; by Berta Stadele, legal representative, Kesselbachstr. 5, D-7775 Bermatingen, both of Germany

[21] Appl. No.: 295,725
[22] PCT Filed: Mar. 13, 1993
[86] PCT No.: PCT/EP93/00579
§ 371 Date: Jan. 3, 1995
§ 102(e) Date: Jan. 3, 1995
[87] PCT Pub. No.: WO93/17838
PCT Pub. Date: Sep. 16, 1993

[30] Foreign Application Priority Data

Mar. 13, 1992 [DE] Germany .............. 9203374 U

[51] Int. Cl.⁶ .................................. B25J 15/04
[52] U.S. Cl. .............. 483/59; 483/901; 483/902; 901/41
[58] Field of Search ............... 414/729; 483/59, 483/900, 901, 902; 403/321–325; 901/28, 29, 27, 41

[56] References Cited

U.S. PATENT DOCUMENTS

| 4,913,617 | 4/1990 | Nicholson . | |
| 5,044,063 | 9/1991 | Voellmer | 483/59 |

FOREIGN PATENT DOCUMENTS

| 1260698 | 4/1961 | France . |
| 2598668 | 11/1987 | France . |
| 3400527 | 7/1985 | Germany . |
| 3514167 | 10/1986 | Germany . |

*Primary Examiner*—Donald W. Underwood
*Attorney, Agent, or Firm*—Bachman & LaPointe

[57] ABSTRACT

A manipulator with at least one arm on which a handling device is fixed by means of a coupling piece, characterized by the fact that sliding bolts, which can be operated from outside, are located in the coupling piece for releasing a locking mechanism between coupling piece and handling device.

5 Claims, 1 Drawing Sheet

MANIPULATOR

BACKGROUND OF THE INVENTION

The invention concerns a manipulator with at least one arm, on which a handline device is detachably mounted via a coupling piece, Manipulators of this type in various shapes and designs are known. They are used especially for manipulating and operating objects, for example in clean rooms or in nuclear plants. The purpose of the manipulators is that the user does not come in contact with the objects to be handled.

If objects, for example nuclear fuel rods or the like are gripped and turned or operated, a corresponding handling apparatus is designed for this purpose and, for example, made as a gripper. In other cases it is necessary to perform different activities which require a different handling apparatus. Thus there is the problem of changing, respectively placing in a magazine, handling devices of different types and designs in areas which are not accessible to a user. This is the task of the present invention.

The fact that sliding bolts for releasing a latch between coupling piece and handling device, which bolts may be operated from the outside, are mounted in the coupling piece leads to the solution of this task.

That is, operating the sliding bolts from the outside, which may be accomplished by means of some object located in the inaccessible place, a wall or the like, releases the interlocking mechanism between coupling piece and handling device.

SUMMARY OF THE INVENTION

Since in the case of a simple loosening of course the handling device would fall down somewhere or be misplaced, the invention provides for a magazine for orderly depositing and holding of the handling device. For the sake of simplicity this magazine consists of two rods which are arranged approximately parallel to each other. Between these rods there are also two guides, which may be inserted into channels, which are molded into the handling apparatus. That is, the handling device is swivelled into the magazine by means of the manipulator, the guides inserting into corresponding channels in the handling device, and thus the handling device is placed in the magazine. However, at the same time the rods push on the above-mentioned sliding bolts, so that an interlocking mechanism in the coupling piece between coupling piece and handling apparatus is released.

In order to facilitate the swivelling and introduction, respectively also the insertion of the bolts, the magazine should have a funnel-shaped magazine opening which narrows inward. In this way the guides are introduced into the channels more easily and the sliding bolts may be slid along the funnel walls and thus guided inward.

In a specific embodiment the problem of unlatching is solved by means of one or several latches which are moved by the sliding bolt and bolts. In a simple embodiment the sliding bolt is connected with a latch via a swivelling lever, the swivelling lever having a fixed pivot point. Sliding bolt and latch are mounted over one another in the coupling piece so that they move opposite one another via the swivelling lever. For example, if the handling device rests with a pin in a graduated hole in the coupling piece and there grips the latch with a detent in a ring groove of the pin, this detent moves out of the locking position when the sliding bolt is pushed into the coupling piece and thus releases the pin. This is a simple but very effective configuration of the interlocking mechanism.

In order for the bolt to move back into its initial position, it is supported in its transverse hole by a coil spring. This is important in the case of the return of the handling device. For returning the handling device namely the coupling piece again is swivelled into the funnel-shaped mouth opening, the sliding bolts travelling inward. With this the latches move out of their latch position and the coupling piece can be placed on the handling piece, the graduated hole receiving the pins. Now the coupling piece is removed from the magazine with the handling device by means of the manipulator, the sliding bolts being driven out of the coupling piece in the funnel-shaped magazine opening and thus at the same time moving the latch to pins of the handling device via the swivelling lever. The latches then enter the above-mentioned ring groove of the pin, by means of which the handling device is securely attached to the coupling piece.

BRIEF DESCRIPTION OF THE DRAWINGS

Further advantages, features, and details of the invention result from the following description of preferred embodiments as well as by means of the drawing; wherein.

DETAILED DESCRIPTION OF PREFERRED EMBODIMENTS

Figure 1:
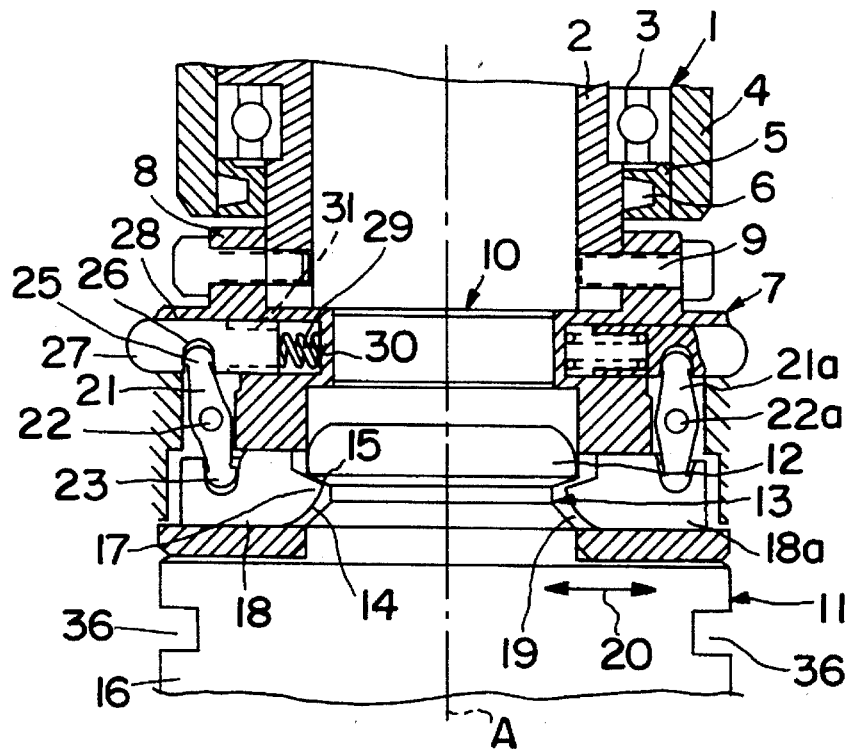
FIG. 1 shows a partially represented longitudinal section of a coupling area between an arm of a manipulator and a handling device.

In FIG. 1 the end of an arm i of a manipulator not shown in greater detail is recognizable, an inner tube 2 being supported against an outer tube 4 via a ball bearing 3. The inner tube 2 turns in the outer tube 4. A supporting ring 5 as well as a gasket ring 6 perform support and sealing.

The inner tube 2 projects from the outer tube 4 with a collar and engages with this collar into a ring collar 8 of a coupling piece 7. There the collar is connected with the ring collar 8 of the coupling piece 7 via corresponding threaded bolts 9.

The coupling piece 7 possesses an axial graduated hole 10 into which a handling device 11, for example a gripping device, is inserted in the operating position. For this a pin 12, which has a ring groove 15, is molded to the handling device 11. This ring groove 15 has two groove walls 14 and 15, the groove wall 14 nearer to a body of a device 16 proceeding at more of a slope than the opposite groove wall 15.

In the operating position the groove wall 15 is engaged by a detent 17 of a latch 18. This latch 18 being mounted so that it can move transverse to a longitudinal axis A in the coupling piece 7 in a chamber 19 extending transverse to the longitudinal axis A. In FIG. 1 the latch 18 is located on the left side in an operating position, in which it engages the groove wall 15, it being introduced into the ring groove 13. The handling device 11 is held in this way. On the right side in FIG. 1 it is recognizable that the latch 18a shown there already is partially drawn out of the ring groove 13, so that the handling device 11 is released in this way.

The latches 18 and 18a move in the direction of the double arrow 20 by means of swivelling levers 21 and 21a, which have a pivot point 22 and 22a, in the middle in the coupling piece 7. This swivelling lever 21 and 21a, engages with a head 23 thereof into a corresponding receptacle 24 in the latch 18. Also on the other side a head 25, which rests in a corresponding receptacle 26 of a sliding bolt 27, is molded to the swivelling lever 21. This sliding bolt 27 also is mounted in a transverse hole 28 in the coupling piece 7 so that it can slide transverse to the longitudinal axis A, it being supported against a bottom 30 of this transverse hole 28 via a coil spring 29. Preferably the coil spring 29 is guided in a blind hole 51, only shown with dashed lines, in the sliding bolt 27.

Thus the motion of the sliding bolt 27 runs approximately parallel to the motion of the latch 18, but in the reverse direction because of the swivelling lever 21. Thus if the two opposite sliding bolts 27 are pushed inward against the force of the coil spring 29 the latches 18 and 18a are swivelled out of the ring groove 13. In this way the pin 12 and with it the handling device 11 are released.

Figure 2:
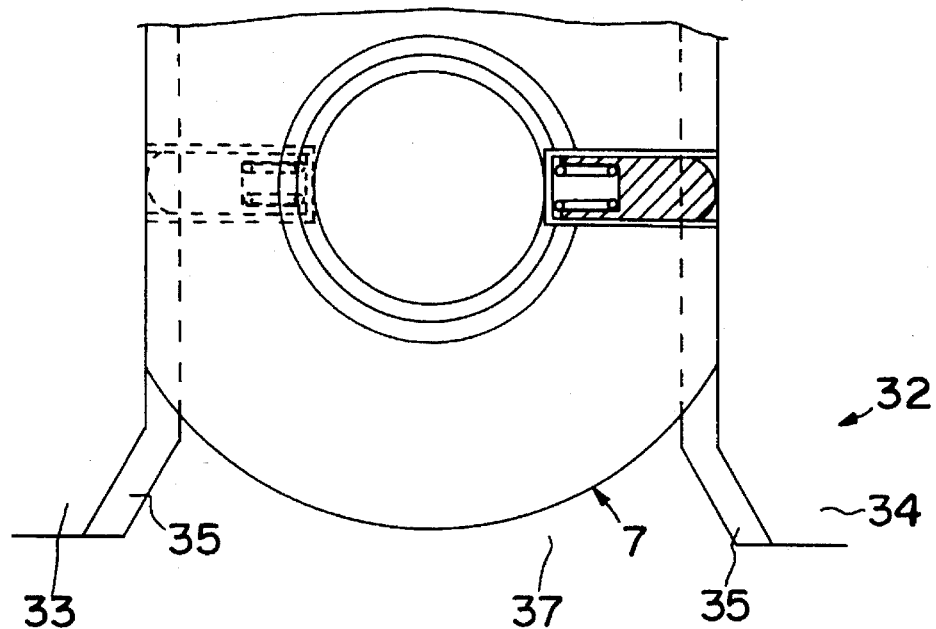
FIG. 2 shows a top view of the coupling area, shown partially in cross-section, in accordance with FIG. 1 in the case of an uncoupling process in a magazine.

A coupling piece 7 made in this way with the sliding bolts 27 and the latches 18 makes automatic changing of handling devices 11 possible by interacting with a magazine 32 indicated in FIG. 2. This magazine 32 essentially consists of two parallel rails 33 and 34, the two rails 33 and 34 being made approximately as mirror images of one another. A guide or strip 35 which fits in a channel 36, which again is molded into the body of the device 16, is molded to each rail. Since two strips 35 are provided in the magazine 32, the body of the device 16 also has two such channels 36. Further, a magazine opening 37 is to be somewhat conical. For changing the handling device 11 the arm 1 with the handling device 11 is swivelled into the magazine opening 37, the guides 35 engaging into the channels 36. In this way the handling device 11 is fixed in the magazine 32. However, at the same time the sliding bolt 27 is pushed through the rails 35 and 34, so that the latches 18 and 18a are swivelled out of their latching position in the ring groove 13. Now in this way the coupling piece 7 is released from the handling device 11 and may be drawn upward out of the magazine 52.

For recoupling the coupling piece 7 to the handling device 11 this coupling piece 7 enters the magazine opening 37 so that the sliding bolts 27 are pushed inward against the force of the coil springs 29. The heights of the rails 33 and 34 in this case are designed so that the coupling piece 7 can pass over the pins 12 with the sliding bolts pushed in. Then the coupling piece 7 is lowered onto the handling device 11. Coupling piece 7 and handling device 11 are removed from the magazine 32 with the arm 1, upon emerging from the magazine opening 37 the sliding bolts 27 giving way to the pressure of the coil springs 29, and the latches 18 and 18a with their detents 17 swivelling into the ring groove 13 of the pin 12. In this way the handling device 11 is held secured to the coupling piece 7.

We claim:

1. A device for manipulating objects, including a manipulator having at least one arm, a coupling piece including sliding bolts for releasing an interlocking mechanism, wherein said interlocking mechanism is positioned between said coupling piece and a handling device having channels molded therein, and a magazine for receiving said handling device, wherein the magazine includes a magazine opening, rails for engaging the sliding bolts and two substantially parallel guides to which the rails are molded, wherein the channels are shaped complementary to the shape of the guides to receive the guides while the handling device is in the magazine, wherein the magazine opening is funnel shaped as defined by a separation between the two rails and between the guides, wherein the separation of the two rails and the guides narrows in a direction extending from the magazine opening into the magazine, and wherein each sliding bolt is located in a transverse hole extending transversely to a longitudinal axis of the coupling piece, the interlocking mechanism of the coupling piece including a chamber and a latch, wherein the chamber extends transversely to the longitudinal axis and the latch extends through the chamber below the transverse hole.

2. The device according to claim 1, wherein the latch is connected with the sliding bolts via swivelling levers.

3. The device according to claim 2, wherein each swivelling lever has two ends, a pivot point located at substantially the middle thereof and a head positioned on each of the two ends, wherein a one of the heads engages in a receptacle in the latch and another of the heads engages in a receptacle in the sliding bolt.

4. The device according to claim 1, wherein the latch includes a detent and the handling device includes a pin molded thereto, wherein the pin has an angular groove and the detent is shaped complementary to the angular groove to engage the angular groove.

5. The device according to claim 1, wherein the sliding bolt is supported by a coil spring in the transverse hole.

* * * * *